US012051302B2

(12) United States Patent
Shigeta

(10) Patent No.: US 12,051,302 B2
(45) Date of Patent: Jul. 30, 2024

(54) CARD-CENTERED ABNORMALITY DETECTION SYSTEM USING CAMERA AND SHOE

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 17/725,966

(22) Filed: Apr. 21, 2022

(65) Prior Publication Data

US 2022/0245997 A1 Aug. 4, 2022

Related U.S. Application Data

(63) Continuation of application No. 16/803,429, filed on Feb. 27, 2020, now Pat. No. 11,341,812, which is a (Continued)

(30) Foreign Application Priority Data

Sep. 14, 2015 (JP) ................................ 2015-198906

(51) Int. Cl.
*G07F 17/32* (2006.01)
*A63F 1/00* (2006.01)
(Continued)

(52) U.S. Cl.
CPC ............ *G07F 17/3241* (2013.01); *A63F 1/00* (2013.01); *A63F 1/06* (2013.01); *A63F 1/14* (2013.01);
(Continued)

(58) Field of Classification Search
CPC ........ A63F 1/00; A63F 2001/001; A63F 1/14; A63F 1/16; A63F 13/70; A63F 2003/00164; G07F 17/3241; G07F 17/322
See application file for complete search history.

(56) References Cited

U.S. PATENT DOCUMENTS 5,941,769 A 8/1999 Order
2003/0176209 A1 9/2003 Soltys et al.
(Continued)

FOREIGN PATENT DOCUMENTS

CN 1162926 A 10/1997
CN 1638842 A 7/2005
(Continued)

OTHER PUBLICATIONS

Korean Office Action issued on Dec. 19, 2022 for KR Patent Application No. 10-2022-7021631.
(Continued)

*Primary Examiner* — Omkar A Deodhar
(74) *Attorney, Agent, or Firm* — NORTON ROSE FULBRIGHT US LLP

(57) ABSTRACT

Conventional systems have a problem that, after drawing cards onto a table in a baccarat game, if a dealer makes a mistake in dealing cards to the Player side and the Banker side or in passing cards to game participants after dealing, the mistake cannot be detected. An abnormality detection system according to the present invention can detect an abnormality or cheating and issue a warning or stop the abnormality or cheating based on an image analysis result from an image analyzing device when, after drawing cards onto a table in a baccarat game, a dealer makes a mistake in dealing cards to the Player side and the Banker side or in passing cards to customers after dealing, for example.

20 Claims, 8 Drawing Sheets

Related U.S. Application Data continuation of application No. 15/759,255, filed as application No. PCT/JP2016/077115 on Sep. 14, 2016, now Pat. No. 10,614,658.

(51) Int. Cl.
*A63F 1/06* (2006.01)
*A63F 1/14* (2006.01)

(52) U.S. Cl.
CPC ........ *G07F 17/322* (2013.01); *G07F 17/3232* (2013.01); *G07F 17/3234* (2013.01); *G07F 17/3272* (2013.01); *G07F 17/3288* (2013.01); *G07F 17/3293* (2013.01); *A63F 2001/001* (2013.01); *A63F 2250/287* (2013.01); *A63F 2250/58* (2013.01)

(56) References Cited

U.S. PATENT DOCUMENTS

| | | | |
|---|---|---|---|
| 2003/0195025 | A1 | 10/2003 | Hill |
| 2005/0062227 | A1 | 3/2005 | Grauzer et al. |
| 2006/0160600 | A1 | 7/2006 | Hill et al. |
| 2008/0224394 | A1 | 9/2008 | Shigeta |
| 2009/0140492 | A1 | 6/2009 | Yoseloff et al. |
| 2012/0080845 | A1 | 4/2012 | Emori et al. |
| 2012/0252564 | A1 | 10/2012 | Moore et al. |
| 2012/0276967 | A1 | 11/2012 | Watanabe |
| 2014/0084538 | A1 | 3/2014 | Downs, III et al. |
| 2015/0014925 | A1 | 1/2015 | Miller et al. |
| 2015/0042042 | A1 | 2/2015 | Shigeta |

FOREIGN PATENT DOCUMENTS

| | | | |
|---|---|---|---|
| CN | 101310803 | A | 11/2008 |
| CN | 101584934 | A | 11/2009 |
| CN | 101804251 | A | 8/2010 |
| CN | 102755729 | A | 10/2012 |
| CN | 104271208 | A | 1/2015 |
| JP | 2012-075781 | | 4/2012 |
| JP | 2015037550 | A | 2/2015 |
| JP | 2015-508674 | | 3/2015 |
| WO | 2015/107902 | | 7/2015 |

OTHER PUBLICATIONS

International Search Report mailed Dec. 13, 2016 in corresponding PCT/JP2016/077115.
First Examination Report dated Aug. 29, 2018 in New Zealand patent application No. 740604.
CN Office Action mailed Sep. 3, 2020 in corresponding/family Chinese Application No. 201680053116.9.
Korean Office Action issued on Nov. 27, 2023 for KR Patent Application No. 10-2023-7029281.
Chinese Office Action issued on Dec. 28, 2023 for CN Patent Application No. 202110726176.5.

CARD-CENTERED ABNORMALITY DETECTION SYSTEM USING CAMERA AND SHOE

CROSS-REFERENCE TO RELATED APPLICATIONS

This application is a continuation of U.S. patent application Ser. No. 16/803,429 filed Feb. 27, 2020, which is a continuation from U.S. patent application Ser. No. 15/759,255 filed Mar. 12, 2018 (now U.S. Pat. No. 10,614,658), which is a national phase application under 35 U.S.C. § 371 of International Pat. App. No. PCT/JP2016/077115 filed Sep. 14, 2016, which claims priority to JP Pat. App. No. 2015-198906 filed Sep. 14, 2015, the entire contents of each of which is specifically incorporated by reference herein.

DESCRIPTION

Technical Field

The present invention relates to an abnormality or cheating detection system for a game in a playroom.

Background Art

In playrooms such as casinos, many table games such as baccarat and blackjack are played. In these games, the standard deck consisting of 52 playing cards is used, and a card dealing device that contains a plurality of (6 to 9 or 10) decks of shuffled playing cards deals playing cards onto a game table.

In playrooms such as casinos, attempts have been made to prevent various abnormalities or cheatings in those table games. An existing technique is to provide a monitor camera that monitors the game table mainly for a cheating, determine a cheating by a customer (game participant), such as fraudulent card change during a game or fraudulent chip movement during a game, from an image obtained from the monitor camera, and prevent the cheating.

The card game monitoring system described in WO 2015/107902 performs monitoring for an abnormality or cheating by using a monitor camera to identify the value of the playing card dealt on the game table from the card dealing device by the dealer and determining whether the identified value agrees with the value of the playing card read by the card dealing device.

SUMMARY OF INVENTION

In the baccarat game, first, the customer bets on the Player or the Banker as the winner of the baccarat game. The dealer then draws cards, facing down, one by one from the card dealing device onto the game table. The dealer first draws four cards, and deals the first card to the Player's hand, the second card to the Banker's hand, the third card to the Player's hand, and the fourth card to the Banker's hand by placing the cards in the Player area or the Banker area. Conventional cheating monitoring systems have a problem that, if the dealer makes a mistake in dealing the cards, the systems cannot detect the mistake.

If it turns out after the game that the dealer has made a mistake in dealing cards, the casino can be responsible for the mistake and suffer a loss.

The first and third cards dealt to the Player's hand and the second and fourth cards dealt to the Banker's hand are passed to the customer who has betted on the Player (in principle, the customer who has made the highest wager when a plurality of customers have betted on the Player) and the customer who has betted on the Banker (in principle, the customer who has made the highest wager when a plurality of customers have betted on the Banker) with the cards facing down, respectively. When the dealer makes a mistake in passing the cards to the customers, there is a problem that the mistake cannot be detected, and the cards dealt to the Player area and the cards dealt to the Banker area may be interchanged.

To solve the various problems described above, an abnormality detection system for a playroom with a game table according to the present invention is an abnormality detection system for a baccarat game, including: a game monitoring device that monitors proceedings of the baccarat game played on a game table using a camera; an image analyzing device that performs image analysis of a video obtained by the camera; a card dealing device that determines and displays a winner/loser result of each game on the game table; a card deal detecting device that identifies an order of dealing and positions of cards dealt on the game table by a dealer based on an analysis result from the image analyzing device; and a controller that stores a rule of the baccarat game and determines whether or not the order of dealing and positions of cards obtained from the card deal detecting device are those in which the cards are dealt in a Player area or a Banker area on the game table according to the rule of the baccarat game, wherein the controller has a function of outputting an abnormality determination result when it is determined that an abnormality that does not conform to the rule of the baccarat game has occurred.

In addition, the card dealing device may further include a deal restricting device that inhibits dealing of cards in response to the output of the abnormality determination result.

In addition, the controller may have a function of determining an abnormality of dealing of cards in each game until the number of cards dealt by the dealer reaches three and activating the deal restricting device that inhibits dealing of cards in response to the determination result so that four or more cards are not dealt on the table when it is determined that an abnormality has occurred.

In addition, the controller may have a function of determining an abnormality of dealing of cards in each game each time the dealer deals a card and activating the deal restricting device that inhibits dealing of cards in response to the determination result so that no card is dealt on the table after it is determined that an abnormality has occurred.

In addition, the controller may have a chip detection function of identifying on which of a Player side or a Banker side on the game table a game participant has betted a chip based on the analysis result from the image analyzing device in each game, the card deal detecting device may have a function of detecting positions and movements of two cards dealt in each area, and the controller may have a function of determining whether or not the two cards dealt in the Player area are moved to in front of the game participant who has betted on the Player side for squeezing and the two cards dealt in the Banker area are moved to in front of the game participant who has betted on the Banker side for squeezing.

In addition, the controller may have a function of further determining whether or not the two cards provided to each game participant for squeezing are correctly placed back in the Player area and the Banker area on the game table.

In addition, the controller may turn on an abnormality indicator lamp provided on either or both of the card dealing device and the game table when it is determined that an abnormality has occurred.

The system according to the present invention can detect an abnormality or cheating and issue a warning or stop the abnormality or cheating when, after drawing cards onto a table in a baccarat game, a dealer makes a mistake in dealing cards to the Player side and the Banker side or in passing cards to customers after dealing, for example.

DESCRIPTION OF EMBODIMENTS

Before detailed descriptions of embodiments, a flow of baccarat game played in playrooms such as casinos will be described.

Figure 1:
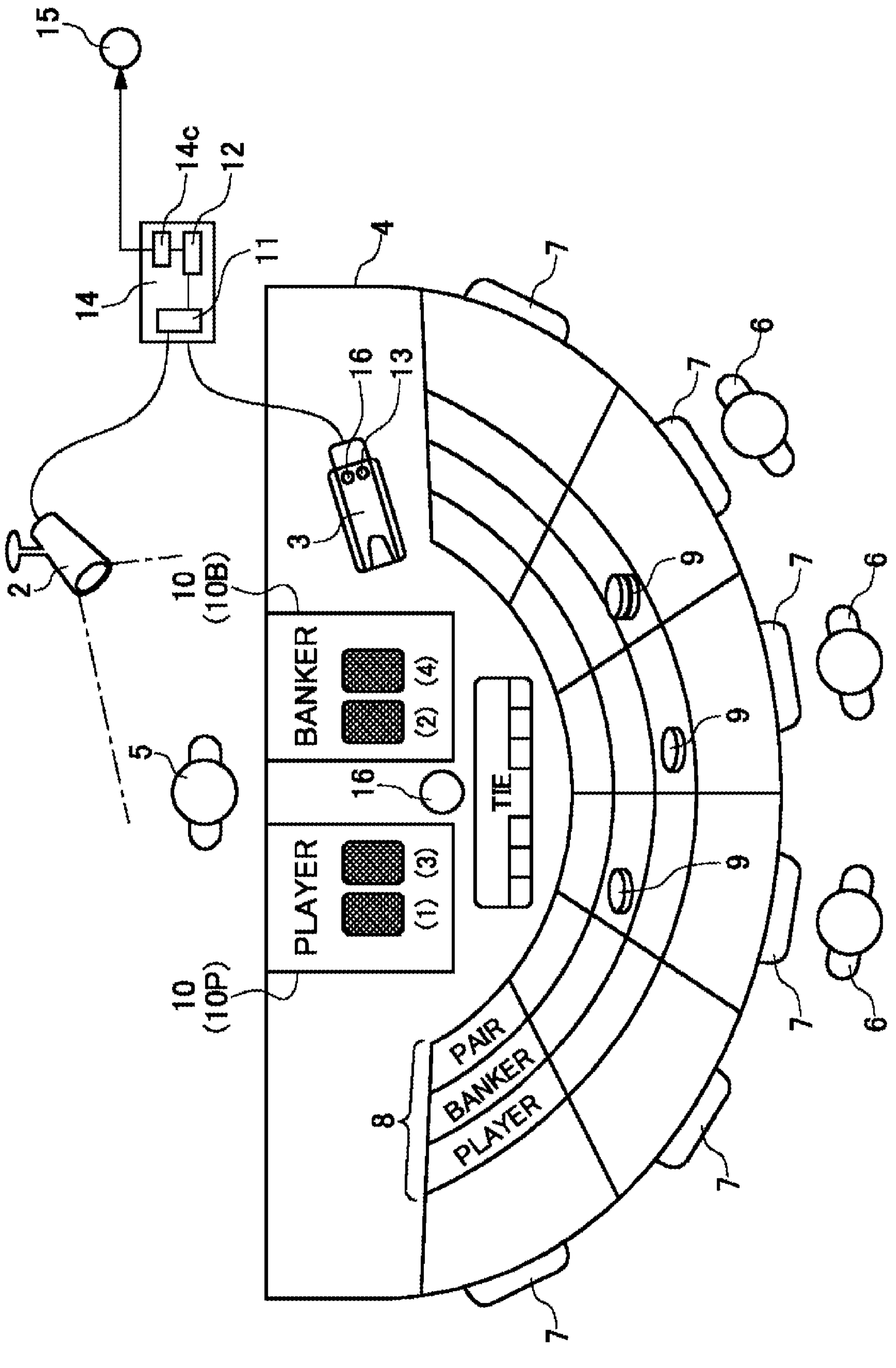
FIG. 1 is a diagram for illustrating an overview of a baccarat game on a game table according to an embodiment of the present invention.

As shown in FIG. 1, a customer (game participant) 6 takes a seat on a chair 7 on the opposite side to a dealer 5 of a game table 4. The customer (game participant) 6 expects whether the Player or the Banker will win or expects that the Player and the Banker will tie, and wagers (referred to also as "bet", hereinafter) on the expected result of the baccarat game by putting a chip 9 in a bet area 8 in front of the customer. The dealer 5 then calls "No more bets" (which means the end of acceptance of bets) and makes a motion such as waving a hand horizontally at an appropriate time for stopping bets from the customers (game participants) 6. After that, the dealer 5 draws playing cards 1, facing down, one by one from a card dealing device 3 onto the game table 4. The dealer 5 first draws four cards, and places the four cards in areas 10 (a Player area 10P and a Banker area 10B) on the game table 4 near the dealer 5: the first card goes to the Player's hand, the second card goes to the Banker's hand, the third card goes to the Player's hand, and the fourth card goes to the Banker's hand, as shown by (1) to (4) in FIG. 1 (a first step).

Figure 3:
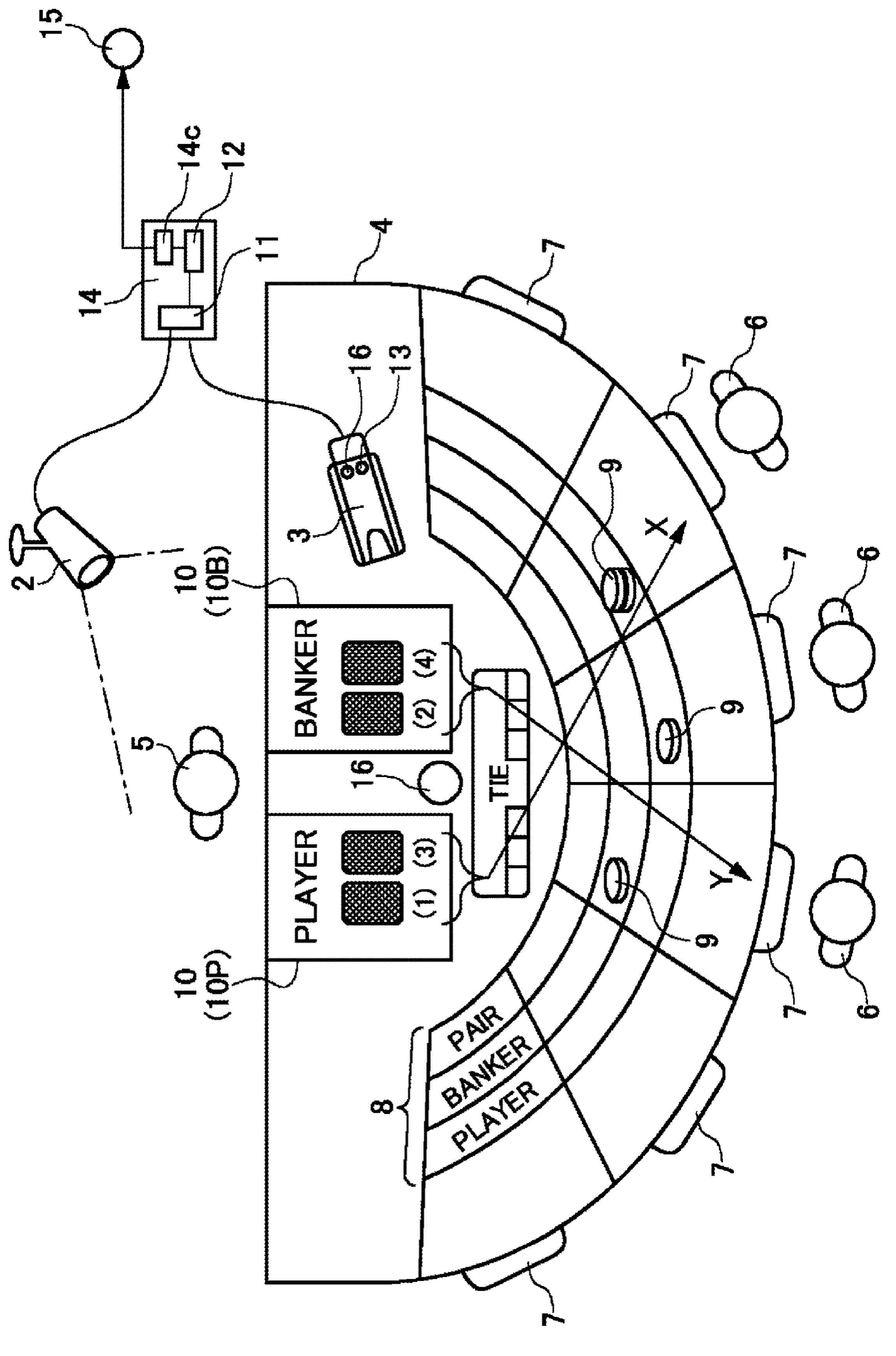
FIG. 3 is a diagram for illustrating how cards on the Player side and cards on the Banker side are passed to game participants according to the embodiment of the present invention.

In some casinos, a service referred to as "squeeze" is then offered to a customer 6 who has betted on the Player and a customer 6 who has betted on the Banker. Specifically, as shown in FIG. 3, the dealer 5 passes the first and third cards 1 dealt to the Player's hand and the second and fourth cards 1 dealt to the Banker's hand in the areas 10 (the Player area 10P and the Banker area 10B) to a customer 6 who has betted on the Player (in principle, the customer 6 who has made the highest wager when a plurality of customers 6 have betted on the Player) and to a customer 6 who has betted on the Banker (in principle, the customer 6 who has made the highest wager when a plurality of customers 6 have betted on the Banker), respectively, with the cards facing down (a second step).

Since all the cards 1 are facing down when the cards are drawn from the card dealing device 3, neither the dealer 5 nor the customers 6 can see the rank (value) or the suit (hearts, diamonds, spades, or clubs) of the cards. After the fourth card 1 is drawn, and the customer 6 receives the card 1, the customer 6 turns the card 1 over (a third step). Typically, this motion of turning the card facing down over is referred to as "squeeze". The "squeeze" is an element that allows the customer 6 to enjoy the game to the fullest.

Based on the ranks (values) of the first to fourth cards 1 and the conditions according to the specific rules of the baccarat game, the dealer 5 draws the fifth card 1 and then the sixth card 1. These cards 1 go to the Player's hand or the Banker's hand, and as with the first to fourth cards 1, the card 1 to the Player's hand is passed to the customer 6 who has betted on the Player for squeezing, and the card 1 to the Banker's hand is passed to the customer 6 who has betted on the Banker for squeezing. Based on the ranks (values) of the first to fourth cards 1 (and the fifth and sixth cards, in certain cases) and the specific rules of the baccarat game, the winner/loser of the game is determined. The rule of the game is programmed in the card dealing device 3 in advance, and the card dealing device 3 is configured to be able to read the information (rank (value) and suit) on the cards 1 dealt and determine the winner/loser of the game. It is determined whether or not the winner/loser (result) of the game determined by the card dealing device 3 agrees with the winner/loser of the game determined by the dealer or the like as described above.

In the following, a summary of the whole of an abnormality or cheating detection system for a game in a playroom according to an embodiment of the present invention will be described. FIG. 1 is a diagram schematically showing the whole of the system. The abnormality or cheating detection system for a game in a playroom includes a game monitoring device 11 that uses a camera 2 to record a video of the proceedings of a game played on the game table 4 including the customers (game participants) 6 and the dealer 5, an image analyzing device 12 that performs image analysis of the recorded video of the proceedings of the game, and the card dealing device 3 that has a function of determining and displaying the result of each game on the game table 4. The card dealing device 3 is a so-called electronic shoe, which is already used by those skilled in the art, has the rules of the game programmed therein in advance, and is configured to be able to determine the winner/loser of the game by reading the information (rank (value) and suit) on the cards 1 dealt. In the baccarat game, for example, the card dealing device 3 determines that the Banker is the winner, that the Player is the winner, or that the game ends in a tie (draw)

based on basically the ranks of the two or three cards, and displays the determination result (winner/loser) via an indicator lamp 13.

The present detection system further includes a controller 14 that detects, based on the image analysis result from the image analyzing device 12, the presence or absence of a card 1 that is drawn from the card dealing device 3 by the dealer 5 and placed in the area 10 (the Player area 10P or the Banker area 10B) on the game table 4 near the dealer 5 as the Player's hand (the Player area 10P) or the Banker's hand (the Banker area 10B). The detection of the presence or absence of a card 1 placed in the area 10 (the Player area 10P or the Banker area 10B) as the Player's hand or the Banker's hand is performed by the image analyzing device 12 using an existing technique commonly used. For example, the detection is performed by image analysis based on the contrast between the color of the Player area 10P and the Banker area 10B and the color of the cards. However, the arrangement that detects the presence or absence of a card 1 is not limited to such an arrangement based on image processing, and a sensor or the like that optically or otherwise detects the presence or absence of a particular object may be used, for example. The image analyzing device 12 and the controller 14 of the present detection system includes a combination of one or more computers, programs and memories.

A card deal detecting device 14C is incorporated in the controller 14 and identifies the order of dealing (such as (1) to (4)) and the positions (the Player area 10P or the Banker area 10B) of cards dealt by the dealer 5 on the game table 4, based on the analysis result from the image analyzing device 12. The controller 14 stores the rules of the baccarat game and determines whether or not the order of dealing and the positions of the cards in the Player area 10P and the Banker area 10B on the game table 4 obtained from the card deal detecting device 14C conform to the rules of the baccarat game. Since the card dealing device 3 knows the ordinal number of each card 1 during deal of cards 1, the controller 14 may determine whether each card 1 is dealt to the Player area 10P or the Banker area 10B based on the information on the order of dealing (such as (1) to (4)) of the cards obtained from the card dealing device 3 and the information from the card deal detecting device 14C. The controller 14 has a function of informing a pit manager or administrative staff of the casino of an abnormality by outputting an abnormality determination result 15 when an order of dealing of cards 1 that does not conform to the rules of the baccarat game is detected and it is determined that an abnormality has occurred. Furthermore, when it is determined that an abnormality has occurred, the controller 14 turns on an abnormality indicator lamp 16 provided on either or both of the card dealing device 3 and the game table 4.

Figure 2:
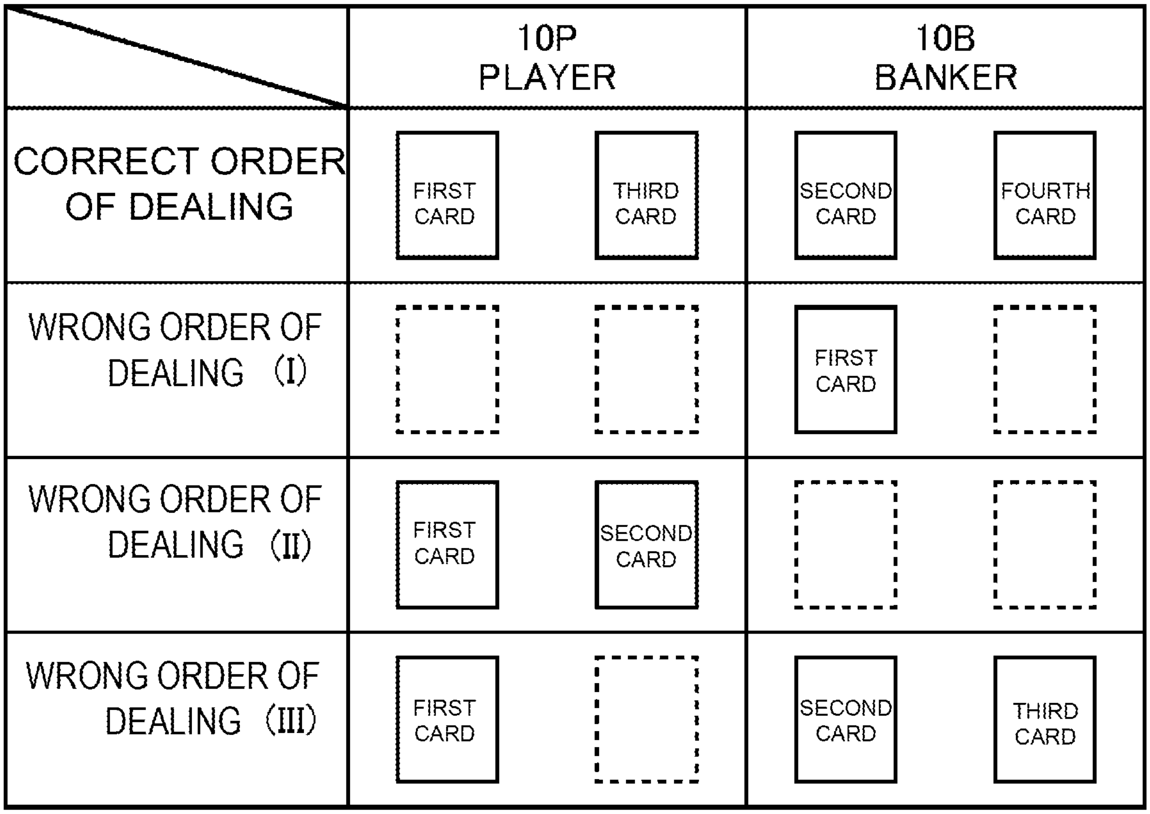
FIG. 2 is a diagram for illustrating the correct order of dealing of cards in the baccarat game according to the embodiment of the present invention and wrong orders of dealing of cards in the baccarat game.

When the dealer 5 correctly deals cards according to the rules of the baccarat game, as shown in FIG. 2, the dealer 5 deals the first card 1 from the card dealing device 3 to the Player's hand, the second card 1 to the Banker's hand, the third card 1 to the Player's hand, and the fourth card 1 to the Banker's hand by placing those cards in the areas 10 (the Player area 10P and the Banker area 10B) on the game table 4 near the dealer 5 (the first step).

In this process, as shown in FIG. 2, the dealer 5 may make a mistake (or intentionally cheat) in dividing the cards 1. The order of dealing (I) in FIG. 2 is an example in which the first card 1, which would otherwise be dealt to the Player's hand, is wrongly dealt to the Banker's hand. The order of dealing (II) is an example in which, after the first card 1 is correctly dealt to the Player's hand, the second card, which would otherwise be dealt to the Banker's hand, is wrongly dealt to the Player's hand. The order of dealing (III) is an example in which, after the first card 1 is correctly dealt to the Player's hand, and the second card 1 is correctly dealt to the Banker's hand, the third card 1, which would otherwise be dealt to the Player's hand, is wrongly dealt to the Banker's hand. Other possibilities include a case where, after the first to third cards 1 are correctly dealt, any of the three cards is intentionally displaced when dealing the fourth card 1, and a case where any of the dealt cards is intentionally or unintentionally displaced at other timings. By the card deal detecting device 14C (which is incorporated in the controller 14) identifying the order of dealing (such as (1) to (4)) and the positions (the Player area 10P or the Banker area 10B) of cards dealt by the dealer 5 on the game table 4 based on the analysis result from the image analyzing device 12, the controller 14 has a function of determining whether an abnormality has occurred or not while the dealer 5 is dealing cards in each game at a timing until the third card is dealt such as the timings described above and activating a deal restricting device in the card dealing device 3 described later in response to output of the determination result 15 to prevent dealing of more cards so that four or more cards 1 are not dealt on the game table 4 when it is determined that an abnormality has occurred. Furthermore, the controller 14 may be configured to detect an abnormality of dealing of each card 1 (such as (I) or (II) in FIG. 2) when the dealer is dealing cards in each game and, in response to the detection result, activate the deal restricting device to prevent dealing of more cards 1 so that no more cards are dealt on the game table 4 after it is determined that an abnormality has occurred.

The present system is configured to be able to detect, based on the image analysis result from the image analyzing device 12, whether or not the card 1 dealt to the Player's hand or the Banker's hand is correctly provided by the dealer 5 to the customer 6 who has betted on the Player (in principle, the customer 6 who has made the highest wager when a plurality of customers 6 have betted on the Player) or the customer 6 who has betted on the Banker (in principle, the customer 6 who has made the highest wager when a plurality of customers 6 have betted on the Banker). To this end, the controller 14 has a chip detection function of determining, based on the analysis result from the image analyzing device 12, in which of a Player bet area 8 and a Banker bet area 8 on the game table 4 each customer 6 (game participant) has placed a chip 9 in each game. Furthermore, the card deal detecting device 14C has a function of detecting positions and movements of the two cards dealt in each area, and the controller 14 has a function of determining whether or not the two cards 1 dealt in the Player area 10P are correctly moved to in front of the game participant 6 who has betted on the Player for squeezing (as shown by X) and the two cards 1 dealt in the Banker area 10B are correctly moved to in front of the game participant who has betted on the Banker for squeezing (as shown by Y).

The positions and total amount of the chips 9 (in which of the Player bet area 8 and the Banker bet area 8 the chips 9 are betted) can be unable to be ordinarily detected because the chips 9 are misaligned and overlap or because the chips 9 are located in a blind spot of the camera 2. The controller 14 is configured to be able to correctly grasp the positions and number of the chips, for example, by recognizing hiding or the like of any chip 9 in the blind spot (the chip may be partially or entirely hidden) by using a self-learning function or the like based on an existing artificial intelligence-based computer or control system or a deep learning (structure)

technique. Furthermore, the arrangement that detects the positions 8 and kinds of the chips 9 in the bet area 8 is not limited to this arrangement, and an ID embedded in the chip 9 may be read and detected, for example.

As described above, the controller 14 can grasp the positions 8 (Player, Banker or Pair), the kinds (different values are assigned to chips 9 of different colors) and the number of the chips 9 betted by each player 6 via the camera 2 and the image analyzing device 12, and can detect which customer 6 has betted on the Player (which customer 6 has made the highest wager when a plurality of customers 6 has betted on the Player) and which customer 6 has betted on the Banker (which customer 6 has made the highest wager when a plurality of customers 6 has betted on the Banker).

After the customer 6 turns over the card 1 provided facing down for squeezing, based on the conditions according to the specific rules of the baccarat game, the dealer 5 draws the fifth card 1 and then the sixth card 1. These cards 1 go to the Player's hand or the Banker's hand, and as with the first to fourth cards 1, the card 1 to the Player's hand is passed to the customer 6 who has betted on the Player for squeezing, and the card 1 to the Banker's hand is passed to the customer 6 who has betted on the Banker for squeezing. After squeezing, the first to fourth cards 1 (and the fifth and sixth cards 1, in certain cases) are placed back in their respective original positions (the Player area 10P or the Banker area 10B). In this case, again, the controller 14 determines whether or not the two cards 1 dealt in each area (and the fifth and sixth cards, in certain cases) are correctly placed back in their respective original positions (the Player area 10P or the Banker area 10B) on the game table 4 (via the camera 2 and the image analyzing device 12). Furthermore, the ranks (values) of the cards 1 are read, and the winner/loser of the game is determined based on the specific rules of the baccarat game.

The image analyzing device 12 compares the winner/loser determined based on the ranks of the cards 1 recognized by image analysis with the winner/loser determined by the card dealing device 3, and detects an abnormal condition (disagreement between the sum of the ranks of the dealt cards 1 and the winner/loser result) that occurs on the game table 1. The card dealing device 3 is configured to be able to read the rank (A, 2, 3, . . . , Q, K) and suit (hearts or spades, for example) of the card 1 manually dealt by the dealer 5, and the controller 14 is configured to be able to check the information on the rank and suit obtained by the image analyzing device 12 from the video (captured by the camera 2) of each card 1 dealt on the game table 4 and the information on the rank and suit read by the card dealing device 3 against each other and determine whether or not the two pieces of information agree with each other. According to the winner/loser result of each game determined by the card dealing device 3, the controller 14 determines whether or not collection of the chips 9 from the customers (game participants) 6 who have lost the game and payment of the chips to the customers (game participants) 6 who have won the game have been properly performed according to the winner/loser result of the game by the image analyzing device 12 analyzing the video of the proceedings of the game.

The image analyzing device 12 and the controller 14 has an artificial intelligence-based or deep learning structure capable of obtaining the information on the rank of the card 1 even if the card 1 dealt on the game table 4 is bent or soiled by the customer 6 during squeezing. The positions, the colors, and the values of the chips 9 can also be discriminated by image analysis and determination based on the artificial intelligence-based computer or control system or the deep learning (structure) technique. Even if the card is bent because of squeezing, which is often performed by the player in the baccarat game or the like, the suit and rank of the card yet to be deformed can be recognized by the artificial intelligence-based computer or control system or the deep learning (structure) technique through self-learning or the like of many examples of image deformation. The artificial intelligence-based computer or control system and the deep learning (structure) technique are already known and available to those skilled in the art, so that detailed descriptions thereof will be omitted.

Next, a mechanism by which the present detection system detects and prevents an abnormality or cheating will be described along the flow of the baccarat game. After the customer 6 bets the Player or the Banker as the winner of the baccarat game, the dealer 5 first draws four cards 1, facing down, one by one from the card dealing device 3 onto the game table 4. The dealer 5 places the cards 1 in the areas 10 (the Player area 10P and the Banker area 10B) on the game table 4 near the dealer 5: the first card 1 goes to the Player's hand, the second card 1 goes to the Banker's hand, the third card 1 goes to the Player's hand, and the fourth card 1 goes to the Banker's hand (the first step).

A cheating or mistake in dealing of the cards 1 to the Player's hand or the Banker's hand is detected by the controller 14, and, at the time of the detection or at another appropriate time, a signal or warning of the cheating or mistake is displayed by the indicator lamp 13, the abnormality indicator lamp 16 or a side monitor 112 of the card dealing device 3, a monitor (not shown) provided on the game table 4 or the abnormality indicator lamp 16 or the like, and dealing of cards after the cheating or mistake is detected is inhibited.

The cards 1 placed in the areas 10 (the Player area 10P and the Banker area 10B) on the game table 4 near the dealer 5 as the Player's hand and the Banker's hand in the first step described above are then provided by the dealer 5 to the customer 6 who has betted on the Player (in principle, the customer 6 who has made the highest wager when a plurality of customers 6 have betted on the Player) and the customer 6 who has betted on the Banker (in principle, the customer 6 who has made the highest wager when a plurality of customers 6 have betted on the Banker) (the second step), respectively. In this process, the dealer 5 may make a mistake (or intentionally cheat) in passing the cards 1 to the customers 6. For example, a card 1 dealt to the Player's hand may be provided to the customer 6 who has betted on the Banker, a card 1 dealt to the Player's hand may be provided to a customer 6 who has not made the highest wager in the customers 6 who have betted on the Player, or the dealt cards 1 may be intentionally changed when the cards are provided to the customer. If the controller 14 detects such a mistake (or intentional cheating), at the time of the detection or at another appropriate time, a signal or warning of the cheating or mistake can be displayed by the indicator lamp 13, the abnormality indicator lamp 16 or the side monitor 112 of the card dealing device 3, a monitor (not shown) provided on the game table 4 or the abnormality indicator lamp 16 or the like, and dealing of cards after the cheating or mistake is detected can be inhibited.

The customer 6 who receives the card 1 facing down in the second step turns the card 1 over for squeezing (the third step). If the controller 14 detects that the rank or suit of the card 1 turned over by the customer 6 differs from the rank or suit of the card 1 read when the card 1 is drawn from the card dealing device 3, at the time of the detection or another appropriate time, a signal or warning of the cheating or mistake can be displayed by the indicator lamp 13, the abnormality indicator lamp 16 or the side monitor 112 of the card dealing device 3, a monitor (not shown) provided on the game table 4 or the abnormality indicator lamp 16 or the like, and dealing of cards after the cheating or mistake is detected can be inhibited.

Figure 4:
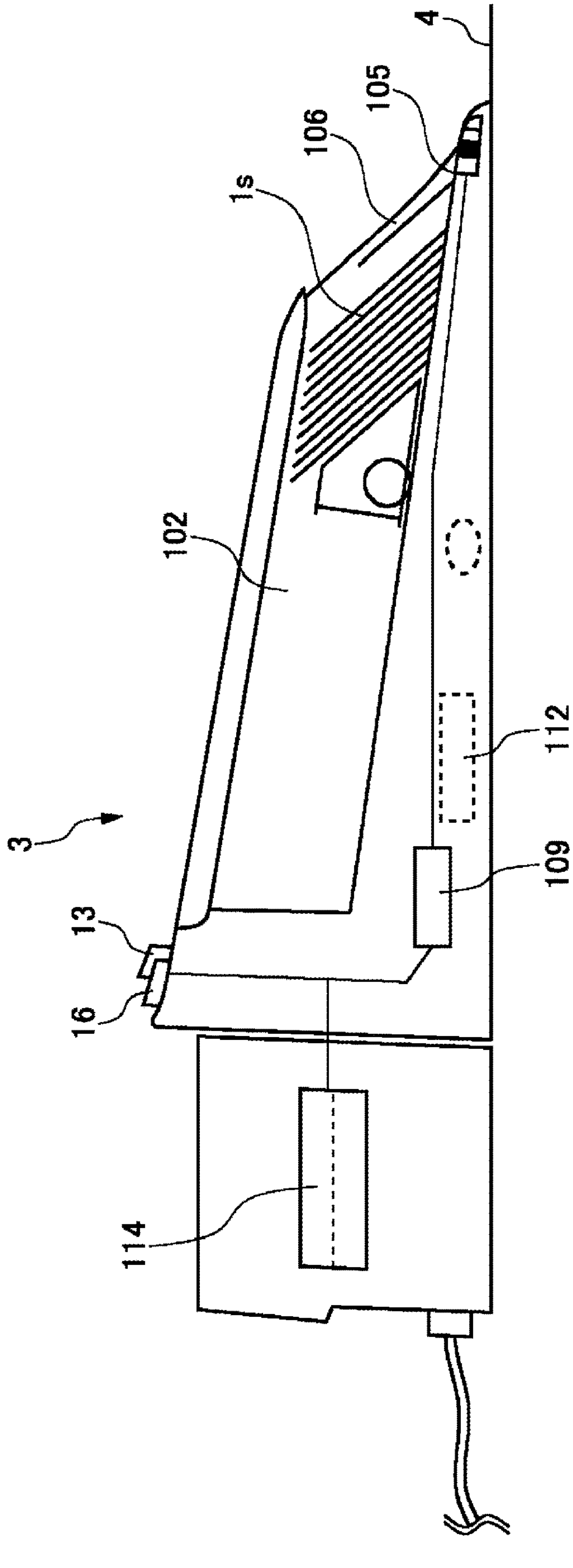
FIG. 4 is a side cross-sectional view of a card dealing device according to the embodiment of the present invention.
Figure 5:
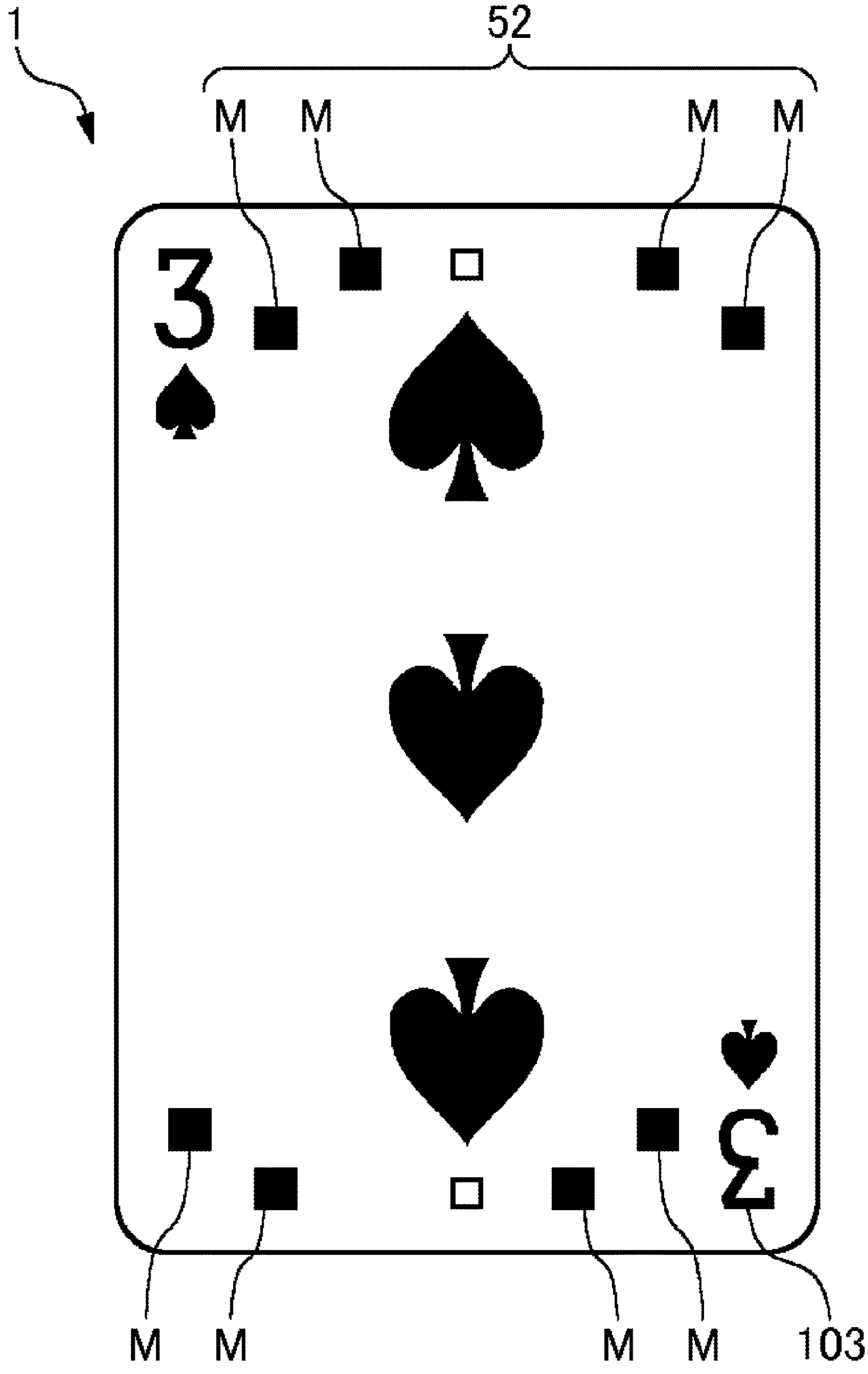
FIG. 5 is a diagram showing an example of a card according to the embodiment of the present invention.
Figure 6:
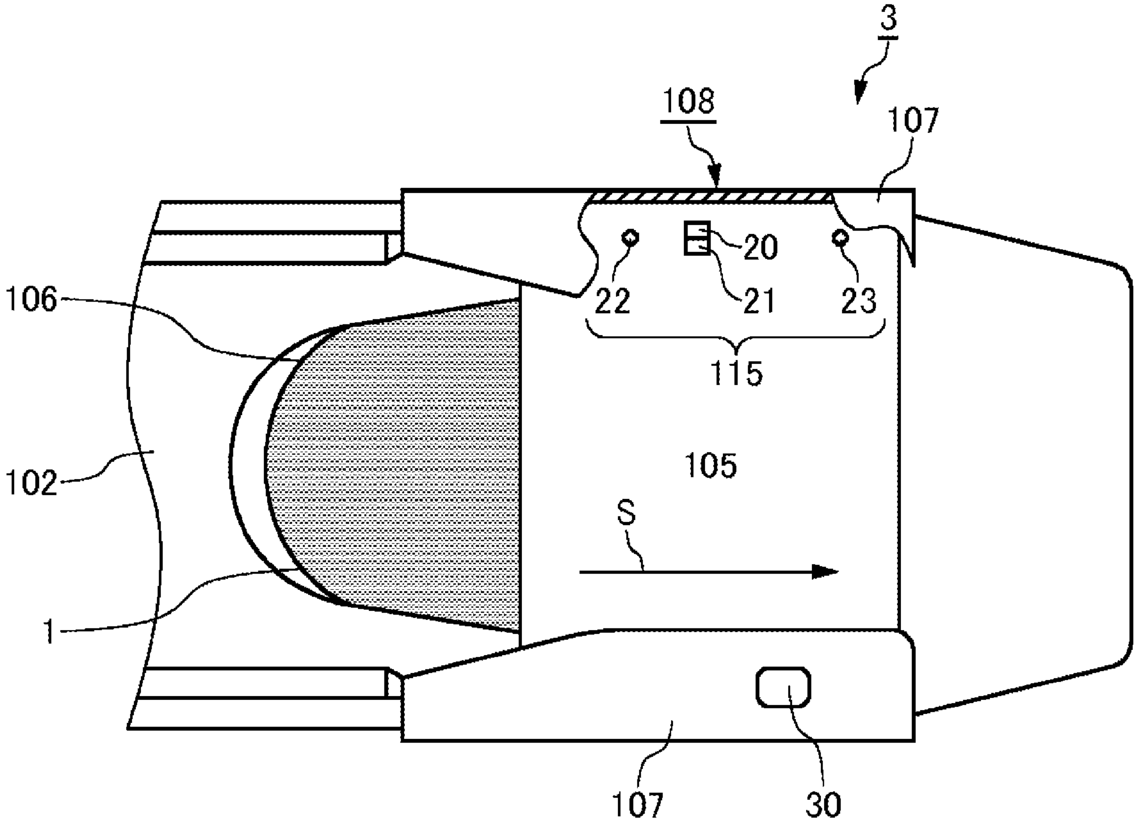
FIG. 6 is a plan view of essential parts of the card dealing device with a card guide part partially cut away according to the embodiment of the present invention.

An embodiment of the card dealing device 3 used in the table game system according to the present invention will be described below with reference to FIGS. 4 to 6. The card dealing device 3 includes a card housing part 102 that houses a plurality of shuffled playing cards 1*s*, a card guide part 105 that guides the shuffled playing cards 1 when the shuffled playing cards 1 are manually drawn one by one from the card housing part 102 onto the game table 4 by the dealer 5 or the like, an opening part 106 through which the cards 1 guided by the card guide part 105 are drawn, a card detection part (card detection sensors 22 and 23) that detects that the shuffled playing cards 1 are drawn when the shuffled playing cards 1 are drawn, a card reading part 108 that reads information indicating at least the value (rank) of the shuffled playing cards 1, a controlling part 109 that determines the winner/loser of the card game based on the values (ranks) of the shuffled playing cards 1 sequentially read by the card reading part 108, a result indicator lamp 13 that indicates the winner/loser result determined by the controlling part 109, the deal restricting device 30 that is provided at the opening part 106 and restricts entry and exit of the cards 1 to and from the card housing part 102, and an administrative control part 114 that has a function equivalent to that of the controller 14. These parts are integrated and have a function of inhibiting drawing of more cards from the card dealing device 3 at the time of the detection or another appropriate time if the controller 14 detects a mistake or cheating by the dealer in the game.

Figure 7A:
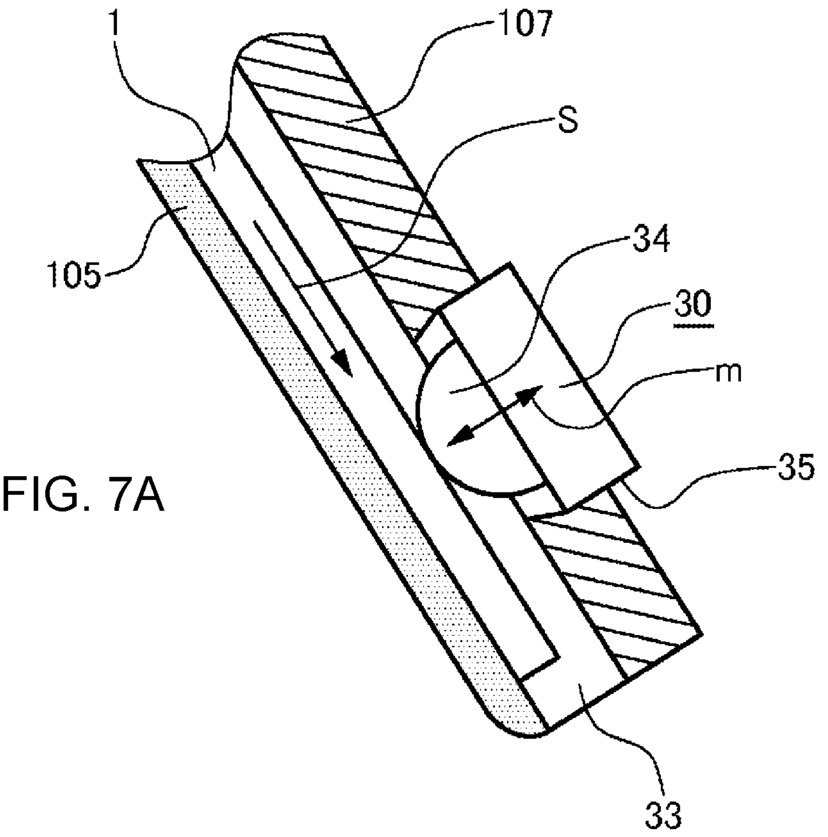
FIG. 7A is a side cross-sectional view of essential parts of a deal restricting device that restricts entry and exit of cards to and from a card housing part of the card dealing device according to the embodiment of the present invention.

Next, the deal restricting device 30 that restricts entry and exit of cards 1 to and from the card housing part 102 will be described with reference to FIG. 7. In FIG. 7A, the deal restricting device 30 is provided in a card guide 107 of the card guide part 105 that guides the cards 1 drawn one by one through the opening 106 in the front of the card housing part 102 onto the game table 4. The deal restricting device 30 has an arrangement in which, when the card 1 passes through a slot 33 between the card guide part 105 and a guide cover of the card guide 107, a lock member 34 presses the card 1 to inhibit entry and exit of the cards 1 through the slot 33. As shown by the arrow m, the lock member 34 is moved by a driving part 35, such as an electromagnetic solenoid or a piezoelectric element, and can assume two positions: a position in which the lock member 34 presses the card 1 (restricting position) and a passage allowing position in which the lock member 34 allows passage of the card 1. The driving part 35 is controlled by the controlling part 109 directly or indirectly connected to the controller 14 by wire or wireless means and moves the lock member 34 between the two positions: the position in which the lock member 34 inhibits movement of the card 1 and the passage allowing position in which the lock member 34 allows passage of the card 1. The rules of the baccarat game is programmed and stored in the controlling part 109 in advance.

Figure 7B:
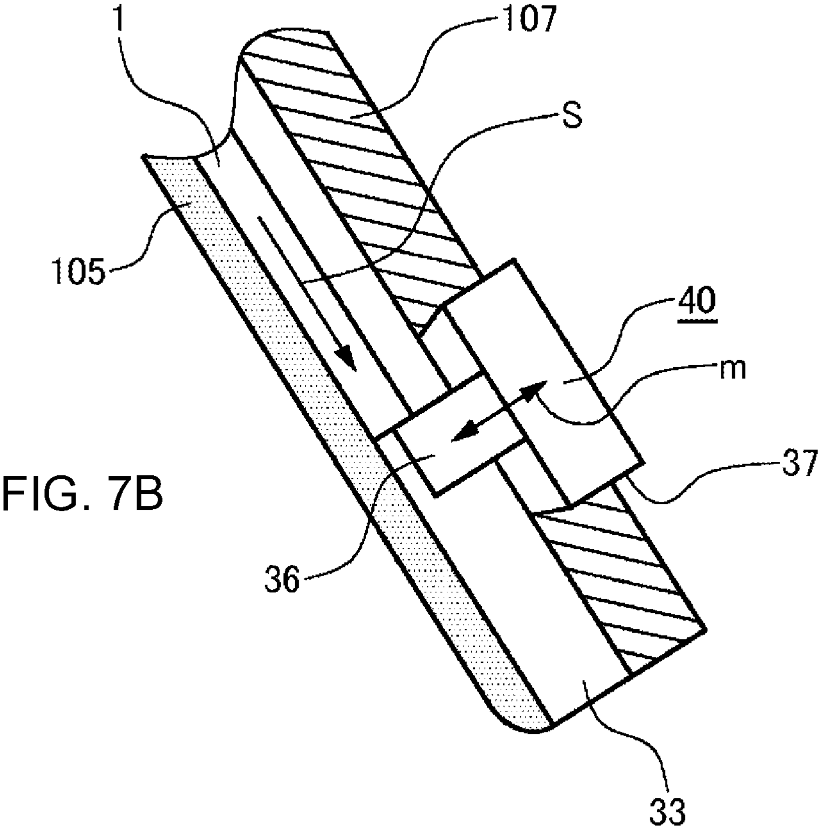
FIG. 7B is a side cross-sectional view of essential parts of a modification of the deal restricting device that restricts entry and exit of cards to and from the card housing part of the card dealing device according to the embodiment of the present invention.

Next, a modification of the deal restricting device 30 will be described with reference to FIG. 7B. A deal restricting device 40 according to this modification has an arrangement in which, when the card 1 passes through the slot 33 between the card guide part 105 and the card guide 107 (guide cover), a lock member 36 protrudes into the slot 33 to inhibit movement of the card 1. As shown by the arrow m, the lock member 36 is moved by a driving part 37, such as an electromagnetic solenoid or a piezoelectric element, and can assume two positions: a position in which the lock member 36 inhibits movement of the card 1 (restricting position) and a passage allowing position in which the lock member 36 allows passage of the card 1. The driving part 37 is controlled by the controlling part 109 connected to the controller 14 and moves the lock member 36 to between the two positions: the position in which the lock member 36 inhibits movement of the card 1 and the passage allowing position in which the lock member 36 allows passage of the card 1.

Next, details of the code reading part 108 that reads a code 52 that represents the value (number, rank) of the card 1 from the card 1 when the card 1 is manually drawn from the card housing part 102 will be described with reference to FIG. 6. FIG. 6 is a plan view showing essential parts of the card dealing device 3. In this drawing, the code reading part 108 is provided on the card guide part 105 that guides, onto the game table 4, the cards 1 manually drawn one by one from the card housing part 102 through the opening 106 in the front thereof. The card guide part 105 is an inclined surface, and the card guide 107 serving also as a sensor cover is attached to both the edges of the card guide part 105. Each of the two card guides 107 can be attached to and detached with a screw or the like (not shown). If the card guide 107 is removed, a group of sensors 115 of the code reading part 108 is exposed. The group of sensors 115 includes four sensors including two ultraviolet rays sensors (UV sensors) 20 and 21 and two object detection sensors 22 and 23.

The object detection sensors 22 and 23 are optical fiber sensors that detect the presence or absence of a card 1, and can detect a movement of the card 1. The object detection sensor 22 is located on an upstream side along the flow of the card 1, and the other object detection sensor 23 is located on a downstream side. As shown in the drawing, the object detection sensor 22 is provided on the upstream side of the UV sensors 20 and 21, and the object detection sensor 23 is provided on the downstream side of the UV sensors 20 and 21. The UV sensors 20 and 21 include an LED (ultraviolet LED) that emits ultraviolet rays and a detector. Marks M of the code 52 are printed on the card 1 with an ultraviolet fluorescent ink that emits light when irradiated with ultraviolet rays. When the card 1 is irradiated with ultraviolet rays (black light), the reflected light from the marks M of the code 52 on the card 1 is detected by the detector. The UV sensors 20 and 21 are connected to the code reading part 108 and the controlling part 109 by cables. The code reading part 108 determines the combination of the marks M and determines the value (rank) that corresponds to the code 52 from the output signal from the detectors of the UV sensors 20 and 21.

Based on the detection signals from the object detection sensors 22 and 23, the start and end of reading by the UV sensors 20 and 21 of the code reading part 108 are controlled by the controlling part 109. In addition, the controlling part 109 determines whether or not the card 1 has normally passed by the card guide part 105 based on the detection signals from the object detection sensors 22 and 23. As shown in FIG. 5, two columns and four rows of rectangular marks M representing the rank (value) and suit (hearts or spades, for example) of the card are arranged along edges of the card 1. When the UV sensors 20 and 21 detect the marks M, the UV sensors 20 and 21 output an ON signal. The code reading part 108 determines a correlation between the signals received from the two UV sensors 20 and 21. Then, the code reading part 108 identifies the code based on the relative difference or the like between the two marks M detected by the two UV sensors 20 and 21, and identifies the corresponding value (rank) and kind (suit) of the card 1.

Figure 8:
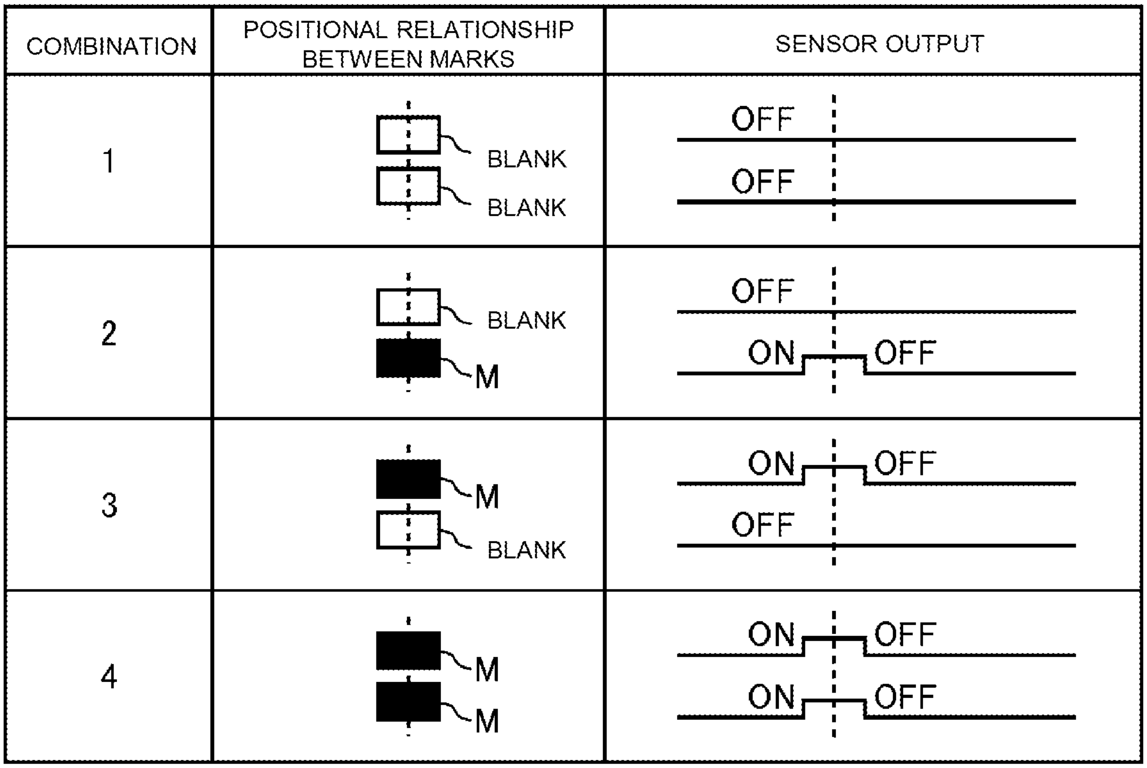
FIG. 8 is a diagram showing a relationship between marks and output waveforms of sensors of the card dealing device according to the embodiment of the present invention.

FIG. 8 shows a relationship between the code 52 and the output status of the ON signals from the UV sensors 20 and 21. A predetermined combination of marks M can be identified based on comparison of relative changes of the output status of the ON signals from the UV sensors 20 and 21. A combination of two, upper and lower, marks M can represent four codes. Thus, 256 ($4^4$) codes can be represented if four such combinations are printed. Each of the 52 playing cards is allocated to any of the 256 codes, the allocation is stored in a memory or program as a reference table, and the code reading part 108 identifies each code 52 and thereby identifies the value (rank) and kind (suit) of the card 1 from the preset reference table (not shown). The 256 codes can be arbitrarily associated with the 52 playing cards, and the association can be stored in the form of the reference table, so that a complicated association is possible, and the association between the 256 codes and the 52 cards can be changed depending on time and place. The code is printed with an ink that becomes visible when irradiated with ultraviolet rays and is desirably printed at a position where the code does not overlap with the suit symbol or an index 103 of the card.

Although various embodiments of the present invention have been described above, of course, those skilled in the art can modify the embodiments described above without departing from the scope of the present invention, and the devices according to the embodiments can be appropriately modified as required by the game to which the present invention is applied.

| Reference Signs List | |
|---|---|
| 1 | playing card |
| 1s | a plurality of shuffled playing cards |
| 2 | monitor camera |
| 3 | card dealing device |
| 4 | game table |
| 5 | dealer |
| 6 | customer (game participant) |
| 7 | chair |
| 8 | bet area |
| 9 | chip |
| 10 | area |
| 10P | Player area |
| 10B | Banker area |
| 11 | game monitoring device |
| 12 | image analyzing device |
| 13 | result indicator lamp |
| 14 | controller |
| 14C | card deal detecting device |
| 15 | output abnormality determination result |
| 16 | abnormality indicator lamp |
| 30 | deal restricting device |
| 33 | slot |
| 34 | lock member |
| 35 | driving part |
| 36 | lock member |
| 37 | driving part |
| 40 | deal restricting device |
| 102 | card housing part |
| 103 | index |
| 105 | card guide part |
| 106 | opening part |
| 107 | card guide |
| 109 | controlling part |
| 112 | side monitor |

The invention claimed is:

1. A system comprising:

a camera configured to capture a plurality of images of a game table where a game is played using cards;

a card recognition device configured to:

use artificial intelligence or deep learning to recognize the cards based on the plurality of images captured by the camera; and recognize ranks and positions of the recognized cards;

a controller configured to identify a card hand of a player of the table game using a recognition result of the card recognition device; and a chip recognition device configured to recognize a chip bet in a bet area on the game table by using the artificial intelligence or the deep learning to recognize the chips based on the plurality of images generated by the camera, wherein the controller is further configured to identify a bet amount in the bet area based on a recognition result of the chip recognizing device.

2. The system according to claim 1, wherein the recognition result indicates, for at least one card of the recognized cards, a rank of the at least one card, a position of the at least one card, or a combination thereof.

3. The system according to claim 1, wherein:

a player area where the card hand of the player is to be placed is arranged on the game table; and the controller is further configured to identify cards located in the player area as the card hand of the player.

4. The system according to claim 1, wherein the controller is further configured to determine whether cards to be the card hand of the player have been correctly dealt into a player area or not.

5. The system according to claim 1, further comprising:

a card dealing device that reads ranks of cards dealt into the game table; and wherein the controller is further configured to determine whether or not ranks read from cards to be the card hand of the player by the card dealing device correspond to ranks of cards identified as the card hand of the player using the recognition result of the card recognition device.

6. The system according to claim 1, wherein the controller is further configured to identify a card hand of a dealer using the recognition result of the card recognition device.

7. The system according to claim 6, wherein:

a dealer area where the card hand of the dealer is to be placed is arranged on the game table; and the controller is further configured to identify cards located in the dealer area as the card hand of the dealer.

8. The system according to claim 6, wherein the controller is further configured to determine a game result according to game rules based on the identified card hand of the player and the identified card hand of the dealer.

9. The system according to claim 1, wherein by using the artificial intelligence or the deep learning, the card recognizing device is configured to recognize a rank of a card that is folded or dirty.

10. The system according to claim 1, wherein:

each time one of the cards is dealt, the camera is configured to capture an image of the card;

the card recognition device is configured to recognize each of the positions of the cards dealt in order; and the controller is further configured to determine whether a combination of the order of dealing of the cards and the positions is correct or not using the recognition result of the card recognizing device.

11. The system according to claim 1, further comprising:

a chip recognition device configured to:

use artificial intelligence or deep learning to recognize chips from the plurality of images captured by the camera; and recognize a chip bet in a bet area on the game table based on the recognized chips; and wherein the controller is further configured to identify a bet amount in the bet area based on a recognition result of the chip recognizing device.

12. A system comprising:

a camera configured to capture a plurality of images of a game table where a game is played using cards;

a card recognition device configured to:

use artificial intelligence or deep learning to recognize the cards based on the plurality of images captured by the camera; and recognize ranks and positions of the recognized cards;

a controller configured to identify a card hand of a player of the table game using a recognition result of the card recognition device;

a chip recognition device configured to:

use artificial intelligence or deep learning to recognize chips from the plurality of images captured by the camera; and recognize a chip bet in a bet area on the game table based on the recognized chips, wherein the controller is further configured to identify a bet amount in the bet area based on a recognition result of the chip recognizing device.

13. The system according to claim 12, wherein the recognition result indicates, for at least one card of the recognized cards, a rank of the at least one card, a position of the at least one card, or a combination thereof.

14. The system according to claim 12, wherein:

a player area where the card hand of the player is to be placed is arranged on the game table; and the controller is further configured to identify cards located in the player area as the card hand of the player.

15. The system according to claim 12, wherein the controller is further configured to determine whether cards to be the card hand of the player have been correctly dealt into a player area or not.

16. The system according to claim 12, further comprising:

a card dealing device that reads ranks of cards dealt into the game table; and wherein the controller is further configured to determine whether or not ranks read from cards to be the card hand of the player by the card dealing device correspond to ranks of cards identified as the card hand of the player using the recognition result of the card recognition device.

17. The system according to claim 12, wherein the controller is further configured to identify a card hand of a dealer using the recognition result of the card recognition device.

18. The system according to claim 17, wherein:

a dealer area where the card hand of the dealer is to be placed is arranged on the game table; and the controller is further configured to identify cards located in the dealer area as the card hand of the dealer.

19. The system according to claim 17, wherein the controller is further configured to determine a game result according to game rules based on the identified card hand of the player and the identified card hand of the dealer.

20. The system according to claim 12, wherein by using the artificial intelligence or the deep learning, the card recognizing device is configured to recognize a rank of a card that is folded or dirty.

* * * * *